A. LINDE, R. WELDE, E. FICKLER & R. RODERWALD.
CYCLE SUPPORT.
APPLICATION FILED AUG. 14, 1907.
938,065.
Patented Oct. 26, 1909.
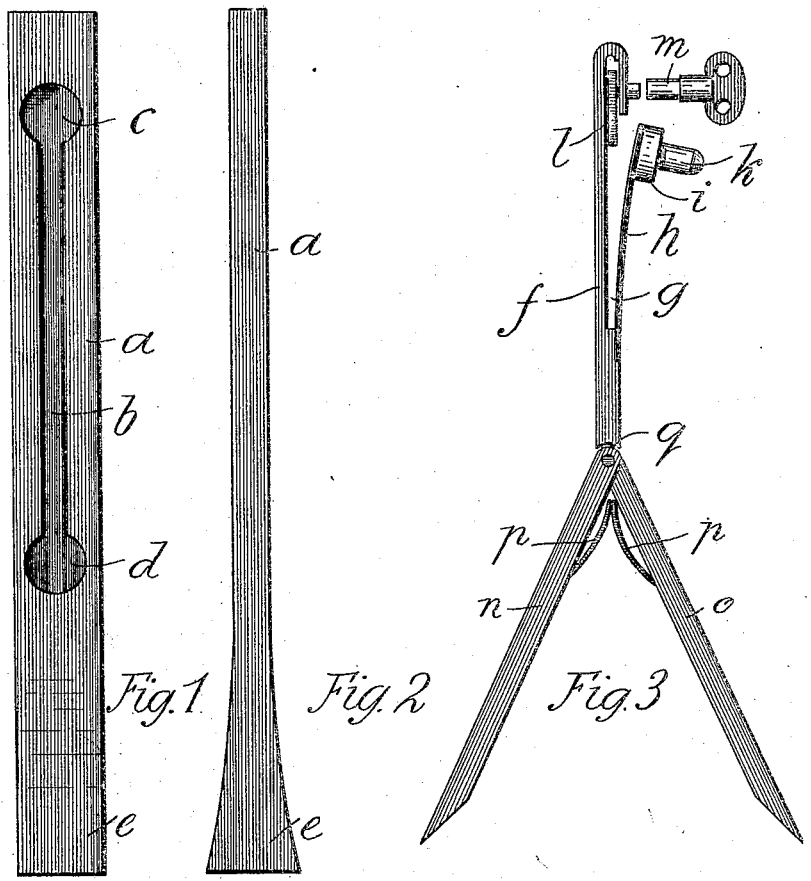
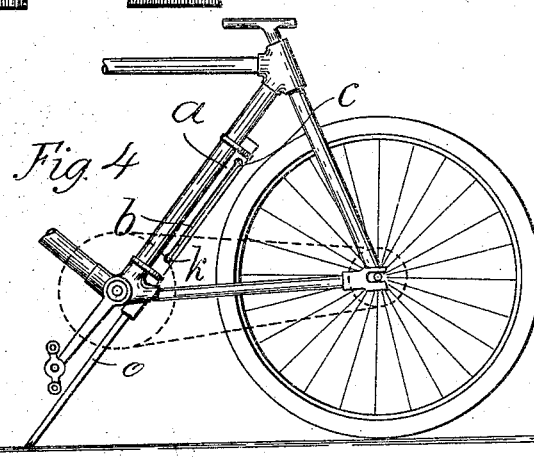
Witnesses
Dora F. Schilling.
S. Brashears
Inventors
Arnold Linde,
Richard Welde,
Ernst Fickler, &
Rudolf Roderwald
By Paul C. Schilling
Attorney

UNITED STATES PATENT OFFICE.

ARNOLD LINDE, OF DEUBEN, RICHARD WELDE AND ERNST FICKLER, OF HAINSBERG, AND RUDOLF RODERWALD, OF DRESDEN, GERMANY.

CYCLE-SUPPORT.

938,065.

Specification of Letters Patent. Patented Oct. 26, 1909.

Application filed August 14, 1907. Serial No. 388,528.

*To all whom it may concern:*

Be it known that we, ARNOLD LINDE, of Deuben, RICHARD WELDE and ERNST FICKLER, of Hainsberg, and RUDOLF RODERWALD, of Dresden, all in the Kingdom of Saxony, German Empire, and all subjects of the German Emperor, have invented certain new and useful Improvements in Cycle-Supports, of which the following is a specification.

The subject of our invention is an improved support or stand for cycles, comprising a tubular portion adapted to be attached to the cycle frame, and a legged portion sliding within the said tube. When the cycle is to be propped, the legs are drawn out; and to prevent theft of the machine, means are provided for locking them in such extended position.

One form of construction of our invention is illustrated in the accompanying drawing, in which—

Figure 1 is a front view of the guide member or casing to be attached to the cycle frame, Fig. 2 is a side view thereof, Fig. 3 is a side view of the slide part with the legs in operative position, and Fig. 4 is a side view of the device in operative position, attached to a cycle, only the rear part of which is shown.

The outer portion of our improved prop consists of a tube $a$ of rectangular or any other suitable cross section, presenting a flared lower extremity $e$, and having a longitudinal slot $b$ terminally widened at $c$, $d$. Into this tube $a$ there is inserted a slide $f$, having a recess $g$, covered by a flat spring $h$. At the end of the latter there is an annular head $i$ adapted to fit the enlargements $c$, $d$, of the slot $b$ in the tube $a$, and tapped to receive a screw stud $k$. The extremity of the slide $f$ is furnished with a bolt $l$, which can be protruded below the spring $h$ by means of a suitable key $m$. The opposite extremity of the slide $f$ has a tongue, to which the two legs $n$, $o$ are pivoted. These legs fold snugly together. They are automatically splayed by springs $p$, $p$, the extent of opening being limited by the edges of the grooved portion $q$ of the slide $f$.

The part $a$ is permanently fastened in any suitable manner to the down-tube and backstays of the cycle, the slide $f$ with retracted legs $n$, $o$ lying concealed within it. In this position of the parts the head $i$ is held by the spring $h$ in the upper enlargement $c$, and thus prevents the legs dropping out.

When the cycle is to be supported, the stud $k$ must be depressed, whereby the head $i$ is released, so that the slide $f$ can be pushed down the tube $a$ until the head $i$ snaps into the enlargement $d$, the legs then protruding as shown in Fig. 4. Owing to the end $e$ being flared, the legs will splay gradually instead of abruptly snapping open, as would otherwise be the case. The head $i$ hinders recession of the legs until the stud $k$ is depressed.

To prevent theft of the cycle, the bolt $l$ can be protruded below the spring $h$ by means of the key. With the parts in this position it is impossible to depress the stud $k$, so that the head $i$ is locked in the lower enlargement $d$ and prevents retraction of the legs.

Having thus described our invention, what we claim as new and desire to secure by Letters Patent is—

A cycle support, comprising in combination, a tubular member having a flared lower end and a longitudinal slot presenting terminal enlargements, a recessed slide located in said tubular member and having spring-actuated pivoted legs, a spring whose one extremity is secured to the slide while its other extremity is located opposite the slide-recess and presents a minor portion adapted to engage in the body of the slot and a major portion adapted to snap into the terminal enlargements only of the slot, and a bolt pivoted in the recess of the slide and adapted to be protruded below the free extremity of the spring and to lock it in either slot-enlargement and thus prevent movement of the slide, substantially as described.

In testimony whereof we affix our signatures in presence of two witnesses.

ARNOLD LINDE.
RICHARD WELDE.
ERNST FICKLER.
RUDOLF RODERWALD.

Witnesses:
PAUL ARRAS,
CLÄRE SIMON.